United States Patent [19]

Kissick

[11] Patent Number: 4,658,922

[45] Date of Patent: Apr. 21, 1987

[54] BALANCE OF PRECISION

[76] Inventor: Lloyd P. Kissick, P.O. Box 26604, Tempe, Ariz. 85282

[21] Appl. No.: 827,350

[22] Filed: Feb. 7, 1986

[51] Int. Cl.$^4$ .......................... G01G 21/28; G01G 1/18
[52] U.S. Cl. ...................................... 177/127; 177/246
[58] Field of Search ......................... 177/126, 127, 246

[56] References Cited

U.S. PATENT DOCUMENTS

| | | | |
|---|---|---|---|
| 327,152 | 9/1885 | Fitch | 177/127 |
| 645,091 | 3/1900 | Harmon | 177/127 |
| 3,082,833 | 3/1963 | Myers | 177/180 X |
| 3,502,163 | 3/1970 | Stehl | 177/126 |
| 3,968,849 | 7/1976 | Dale et al. | 177/127 |

Primary Examiner—George H. Miller, Jr.
Attorney, Agent, or Firm—Nissle & Leeds

[57] ABSTRACT

An improved balance of precision. The fulcrum of the balance is integrally formed in a protective housing. The housing is utilized in conjunction with the beam of assembly of the balance to determine when the balance is in equipoise. When the fulcrum and beam assembly are packaged in the housing for transport, the housing stabilizes the beam assembly to minimize the likelihood of damage to the beam assembly during transport of the balance.

2 Claims, 4 Drawing Figures

BALANCE OF PRECISION

This invention relates to balances of precision.

More particularly, the invention relates to a compact housed balance of precision for measuring the weight of precious metals and stones.

In another respect, the invention relates to a balance of precision in which the fulcrum of the balance is integrally formed with a protective housing, the housing being utilized in conjunction with the beam assembly of the balance to determine when the balance is in equipoise.

In a further respect, the invention relates to a balance of the type described in which, when the balance is packaged in its protective housing, the housing stabilizes the beam of the balance and minimizes the likelihood that the beam will be damaged during transport.

In still another respect, the instant invention relates to a housed balance of precision of the type described which includes a pan carried on support arms on one side of the balance fulcrum and includes on the other side of the fulcrum a beam with an adjustable weight, the pan, housing and pan support arms being shaped and dimensioned such that the pan can be removed from its support arms and securely stored in the housing beneath the support arms during transport of the balance.

Jewelers and chemists often have need for a balance of precision which is portable, can be carried on the person, and can be readily unpackaged and utilized to accurately determine the weight of quantities of precious metals or stones. Existing balances of precision are typically finely crafted, expensive instruments which must be treated gingerly in order to avoid damaging the knife edges, pans or other sensitive components of the instruments. Packaging, transporting, and utilizing such instruments is time consuming.

Accordingly, it would be highly desirable to provide an improved balance of precision which could be carried on the person, be quickly prepared for transport in a protective housing and could, after being dropped or subjected to considerable other abuse during transport, be readily unpackaged from the protective housing, assembled, and utilized to accurately determine the weight of a quantity of precious metal or stones.

Therefore, it is a principal object of the invention to provide an improved balance of precision.

Another object of the invention is to provide an improved balance of precision which can be carried on the person and can, when packaged for transport, be dropped and generally subjected to substantial abuse without damaging the operative components of the balance.

A further object of the invention is to provide an improved balance of precision which includes a protective housing that, during transport of the balance, stabilizes operative components of the balance to minimize the likelihood of damage thereto.

Still another object of the instant invention is to provide an improved balance of precision having a protective housing which is utilized in conjunction with the beam of the balance to determine when the balance is in equipoise.

These and other, further and more specific objects and advantages of the invention will be apparent to those skilled in the art from the following detailed description thereof, taken in conjunction with the drawings, in which.

Briefly, in accordance with my invention, I provide an improved balance of precision. The balance includes an elongate base having a first end and a second end, a floor, and a wall upwardly extending from the first end and having a generally horizontally oriented upper edge; a fulcrum connected to the base and having an elongate edge positioned a distance above the floor of the base; an elongate beam assembly positioned on the fulcrum for turning about the fulcrum edge; and, a cover for the base. The elongate beam assembly includes a member positioned over and including an elongate groove contacting the fulcrum edge to permit the member to turn about the edge; a pair of spaced apart support arms attached to and outwardly extending from the member and each having an elongate upper edge, an outer end, and a notch formed in the upper edge at the couter end thereof; a symmetical pan having an upper lip normally positioned above the upper edges of the support arms, and a pair of ears extending outwardly from the pan, each ear normally riding in one of the notches such that the ear can turn in the notch and support the pan above the floor when the lever assembly is in equipoise; and, a pair of spaced apart scale arms attached to and outwardly extending from the member and each having an outer end generally positioned between the fulcrum and the wall and adjacent the upper edge of the wall when the lever assembly is in equipoise. The scale arms are generally parallel to the upper edges of the support arms. One of the scale arms includes a tare slidably mounted thereon for movement to and from the fulcrum edge to zero balance the beam assembly. The other of the scale arms includes a measurement scale and weight slidably mounted thereon for balancing the beam assembly when an object is placed in the pan. The scale arms are generally positioned below the fulcrum edge and the elongate upper edges of the support arms are positioned above the fulcrum edge when the beam assembly is in equipoise. The pan has a height less than the shortest distance of the upper edges of the support arms above the floor beneath the upper edges thereof when the beam assembly is in equipoise. The pan is shaped, contoured and dimensioned to be removed from the support arms, turned upside down and stored on the floor of the base beneath and between the support arms. The cover includes a top wall and side walls and is shaped and dimensioned to fit over and enclose the end wall of the base, the fulcrum, the support arms, the scale arms and the pan positioned upside down on the floor of the base. The top wall of the cover can contact the upper edges of the support arms when the cover is placed on the base.

Figure 1:
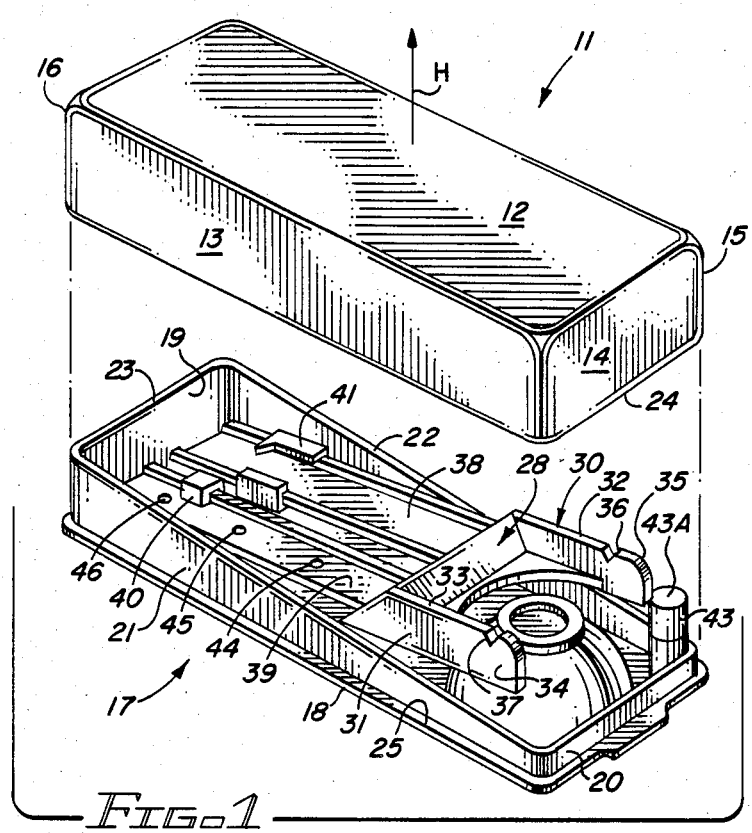
FIG. 1 is a perspective assembly view illustrating a balance of precision constructed in accordance with the principles of the invention and packaged in its protective housing for transport therein.
Figure 2:
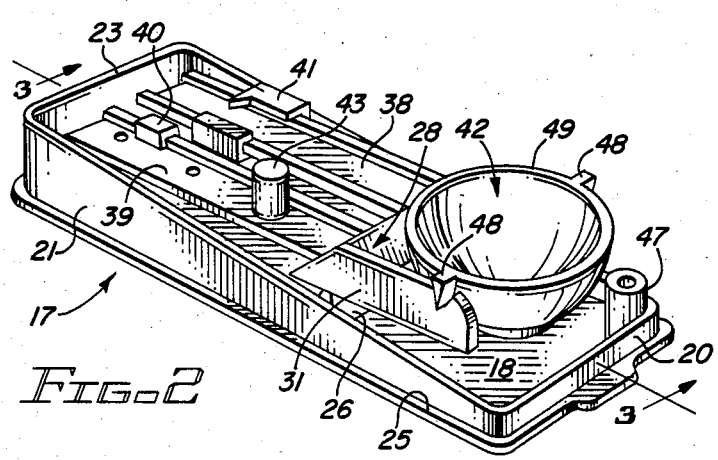
FIG. 2 is a perspective view of the balance of precision of FIG. 1 assembled and prepared to determine the weight of material placed in the pan thereof.
Figure 4:
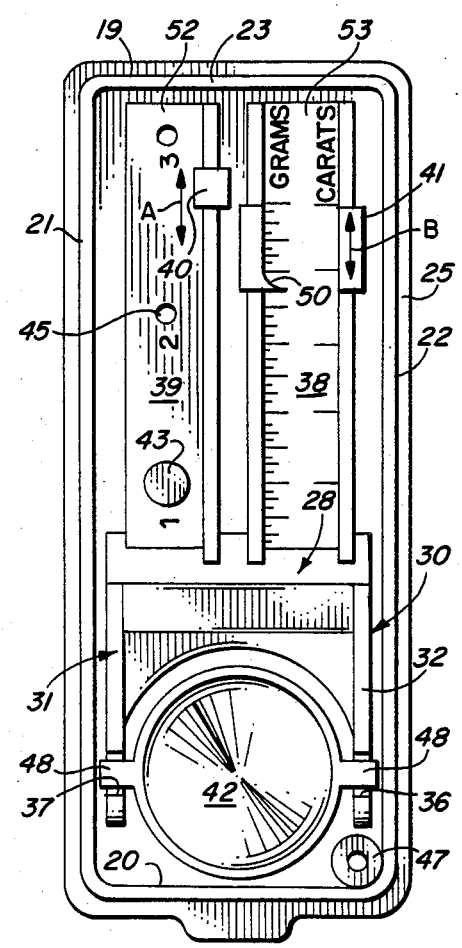

Turning now to the drawings, which depict the presently preferred embodiments of the invention for the purpose of illustrating the practice thereof and not by way of limitation of the scope of the invention, and in which like reference characters refer to corresponding elements throughout the several views, FIGS. 1 to 4 illustrate a balance of precision constructed in accordance with the principles of the invention and including a protective housing having a hollow cover 11 having top wall 12, side walls 13–16. Side walls 15 and 16 are not visible and are parallel and equivalent in shape and dimension to walls 13 and 14, respectively. Cover 11 fits over base 17 which includes floor 18. End walls 19 and 20 and side walls 21 and 22 upwardly depend from floor 18. End wall 19 includes upper horizontal edge 23 parallel to floor 18. When cover 11 is placed on base 17, walls 20–23 slidably fit within walls 13–16 of cover 11 and lower peripheral lip 24 of cover 11 circumscribes walls 20–23 and contacts lip 25 of base 17 circumscribing walls 20–23. Upstanding fulcrum 26 is integrally formed with floor 18 and includes upper horizontal knife-edge 27. Elongate triangular-shaped member 28 includes groove 29 which is shaped like an inverted "V" and pivotally rides or turns on knife edge 27 of fulcrum 26. Support arms 30, 31 outwardly extend from member 28 and include upper edges 32 and 33 and outer ends 34 and 35. Notches 36 and 37 are formed in outer ends 35 and 34, respectively. Notches 36, 37 receive the lower knife-edges of ears 48 outwardly extending from pan 42. The knife-edges of ears 48 permit pan 42 to pivot in notches 36, 37 and generally maintain under the force of gravity a position with upper circular edge 49 generally lying in an imaginary horizontal plane. Scale arms 38 and 39 outwardly extend from member 28. Arm 39 is provided with tare 40 which can be slidably adjusted along arm 39 in the direction of arrows A to zero balance the beam assembly of the balance. Weight 41 is slidably mounted on arm 38 and is, after the beam assembly is zero balanced and an object is placed in pan 42, moved along arm 38 in the direction of arrows B until the beam assembly is in equipoise. As shown in FIG. 4, weight measurement scales in grams and carats are inscribed on the surface of arm 38. If additional weight is desired on the side of fulcrum 26 to which arms 38, 39 extend, auxiliary cylindrical weight 43 can be inserted in one of apetures 44–46. When not in use, weight 43 is inserted in holder 47. Weight 41 includes pointer 50. In FIG. 4 pointer 50 slides along the "grams" scale. In FIG. 2, pointer 5 is on the carats scale. The entire beam assembly, including support arms 30, 31, member 28 and scales arms 38 and 39, can be lifted upwardly away from base 17 and off of fulcrum edge 27. After the beam assembly is lifted off of fulcrum edge 27, weight 41 in FIG. 4 can be slid away from member 28 and off of arm 38, rotated 180°, and slid back onto arm 38 in the orientation shown in FIG. 2. As shown in FIG. 1, pan 42 can be removed from support arms 30 and 31, turned upside down, and placed on floor 18 beneath and between arms 30 and 31 with circular lip 49 contacting floor 18.

Figure 3:
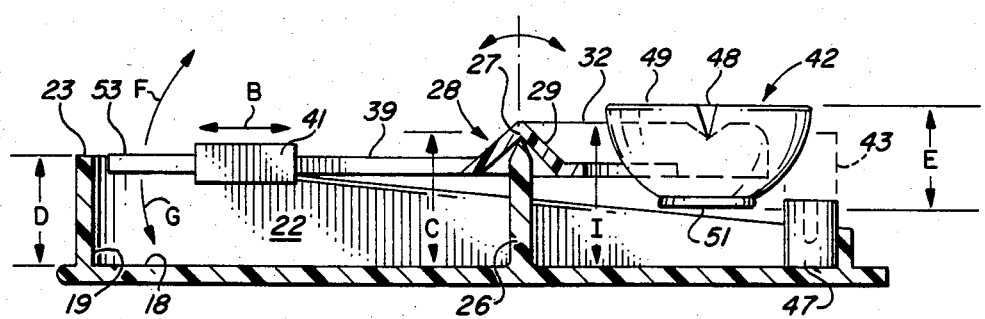
FIG. 3 is a section view of the balance of precision of FIG. 2 illustrating the position of the beam assembly thereof when the balance is in equipoise; and, FIG. 4 is a top view of the balance of precison of FIG. 2 further illustrating construction details and the mode of operation thereof.

In FIG. 3, arrows C indicate the shortest distance from floor 18 to fulcrum edge 27. Edge 27 is parallel to floor 18. Arrows D represent the shortest distance from floor 18 to upper horizontal edge 23 of wall 19. Arrows E represents the shortest distance between the bottom 51 and the horizontal imaginary plane passing through upper edge 49 of pan 42. Distances E and D are less than or equal to distance C. Distances E and D being less than or equal to distance C permits pan 48 to be stored in the manner illustrated in FIG. 1 and permits edge 23 to be used in conjunction with ends 52 and 53 of arms 39 and 38, respectively, to determine when the balance is in equipoise. Arrows F represent the shortest distance from floor 18 to upper edges 32 and 33 when the beam assembly is in equipoise. Distance F is selected such that when cover 11 is placed on base 17 with peripheral edge 24 contacting edge 25, upper edges 32 and 33 generally contact top surface 12 top wall 12. When edges 32 and 33 contact top wall 12 of cover 11, the beam assembly is immobilized on edge 27. Immobilization of the beam assembly by cover 11 helps prevent the beam assembly and knife edge from being damaged during transport if the balance of FIG. 1 is dropped or otherwise abused.

In use, base 17 is placed on a level surface and cover 11 is removed from base 17 in the direction of arrow G in FIG. 1. The beam assembly, including components 38, 39, 28, 30 and 31, is lifted from fulcrum 26 and pan 42 is removed from floor 18. The beam assembly is placed back onto fulcrum 26 with notch 29 riding on edge 27 and the lower knife edges of ears 48 are positioned in slots 36 and 37 in the manner illustrated in FIGS. 2–4. Auxiliary cylindrical weight 43 is positioned in holder 47. Weight 41 is slid along arm 38 toward member 28 until pointer 50 is at the zero reading on the grams scale. Tare 40 is moved along arm 39 in the directions of arrows A until the beam assembly is in equipoise and ends 52 and 53 are level with upper edge 23 in the manner illustrated in FIG. 3. The object to be weighed is placed in pan 42, causing pan 42 to move downwardly and ends 52, 53 to move upwardly in the direction of arrow F in FIG. 3. Weight 41 is moved outwardly away from member 28 to cause ends 52 and 53 to move downwardly in the direction of arrow G. The position of weight 41 is adjusted along arm 38 until ends 52 and 53 are level with upper edge 23 of wall 19. The grams scale on arm 38 is read to determine the weight of the object in pan 42. If, after an object is placed in pan 42, weight 41 is slid outwardly away from the member 28 to the end of the grams scale and ends 52 and 53 are still positioned above edge 53, auxiliary weight 43 can be removed from holder 47 and placed in aperture 44, 45 or 46 to provide the additional weight necessary to enable the beam assembly to be placed in equipoise by adjusting the position of weight 41 on scale arm 38.

In order to permit the beam assembly to be enclosed by base 17 and cover 11 in the manner described herein, arms 38 and 39 must generally be positioned beneath and edges 32 and 33 be positioned above fulcrum edge 27 when the beam assembly is in equipoise. In addition, pan 42 must be storable beneath support arms 30, 31 and scale arms 38, 39 on floor 18 of base 17. As would be appreciated by those of skill in the art, if the balance of the invention were constructed such that ears 48 and the upper portions of pan 42 did not extend upwardly past edges 32 and 33, then it would not be necessary to remove and store pan 42 prior to placing cover 11 on base 17. However, removing and storing pan 42 on floor 18 minimizes the likelihood of damage to the pan 42 and beam assembly during transport of the balance.

Cover 11, auxiliary weight 43 and holder 47 are shaped and dimensioned such that when weight 43 is in holder 47 and cover 11 is placed over base 17 with lip 24 contacting lip 25, top 43A of weight contacts top wall 12 of cover 11 such that cover 11 maintains weight 43 in storage in holder 47 during transport of the balance of the invention.

Having described my invention in such terms as to enable those skilled in the art to which it pertains to understand and practice it, and having described the presently preferred embodiments thereof, I claim:

1. A balance of precision including
   (a) an elongate base having
      (i) a first end and a second end,
      (ii) a floor, and
      (iii) a wall upwardly extending from said first end and having a generally horizontally oriented upper edge;
   (b) a fulcrum connected to said base and having an elongate edge positioned a distance above said floor of said base;
   (c) an elongate beam assembly positioned on said fulcrum for turning about said fulcrum edge, said beam assembly including
      (i) a member positioned over and including an elongate groove contacting said fulcrum edge to permit said member to turn about said edge,
      (ii) a pair of spaced apart support arms attached to and outwardly extending from said member and each having
         an elongate upper edge,
         an outer end, and
         a notch formed in said outer end thereof,
      (iii) a symmetrical pan having
         an upper lip, and
         a pair of ears extending outwardly from said pan, each ear normally riding in one of said notches such that said ear can turn in said notch and support said pan above said floor when said lever assembly is in equipoise,
      (iv) at least one scale arm attached to and outwardly extending from said member and having an outer end generally positioned between said fulcrum and said wall and adjacent and level with said upper edge of said wall when said beam assembly is in equipoise,
         said scale arm including a measurement scale and weight slidably mounted thereon for balancing said beam assembly when an object is placed in said pan,
         said scale arm generally being positioned below said fulcrum edge when said beam assembly is in equipoise,
         said elongate upper edges of said support arm being positioned above said fulcrum edge when said beam assembly is in equipoise,
         said pan having a height less than the shortest distance of said upper edges of said support arms above said floor beneath said upper edges when said beam assembly in is equipoise and being shaped, contoured and dimensioned to be removed from said support arms, and stored on the portion of said floor of said base generally beneath and between said support arms; and,
   (d) a cover for said base, said cover having a top wall and side walls and being shaped and dimensioned to fit over and enclose said end wall of said base, said fulcrum, said support arms and scale arms.

2. A balance of precision including
   (a) a case including
      (i) an elongate base having
         a first end and a second end,
         a floor, and
         a wall upwardly extending from said first end and having a generally horiztonally oriented upper edge; and,
      (ii) a cover for said base;
   (b) a support member connected to said base and having a fulcrum positioned a distance above said floor of said base;
   (c) an elongate beam assembly positioned on said fulcrum for turing thereabove, said beam assembly including
      (i) a member positioned on and contacting said fulcrum to permit said member to turn about said fulcrum,
      (ii) a pair of spaced apart support arms attached to and outwardly extending from said member and each having
         an elongate upper edge, and an outer end,
      (iii) a symmetrical pan pivotally mounted on said outer ends of said support arms, said pan being suspended above said floor by said arms when said lever assembly is in equipoise,
      (iv) at least one scale arm attached to and outwardly extending from said member and having an outer end generally positioned between said fulcrum and said wall, said scale arm
         being positioned above said floor when said beam assembly is in equipoise, and adjacent and level with said upper edge of said wall, and
         including a measurement scale and weight slidably mounted thereon for balancing said beam assembly when an object is placed in said pan,
         said upper edges of said support arms being positioned above said floor when said beam assembly is in equipoise,
         said cover having a top wall and side walls and being shaped and dimensioned to fit on said base and enclose said fulcrum, said support arms, scale arm and pan.

* * * * *